United States Patent [19]

Peana et al.

[11] Patent Number: 5,074,455
[45] Date of Patent: Dec. 24, 1991

[54] SOLDER FLUX DISPENSER SUITABLE FOR USE IN AUTOMATED MANUFACTURING

[75] Inventors: Stefan Peana; Jerrold S. Pine, both of Boca Raton, Fla.

[73] Assignee: Motorola, Inc., Schaumburg, Ill.

[21] Appl. No.: 594,492

[22] Filed: Oct. 9, 1990

[51] Int. Cl.$^5$ ............................................. B23K 1/00
[52] U.S. Cl. ................................. 228/35; 228/207; 228/223; 228/33; 401/198; 401/27
[58] Field of Search ................ 228/33, 35, 52, 207, 228/223; 222/214, 394, 135, 481.5; 401/44, 45, 17, 22, 23, 27, 205, 156, 162, 163, 198, 264, 266, 267

[56] References Cited

U.S. PATENT DOCUMENTS

| | | | |
|---|---|---|---|
| 1,413,953 | 4/1922 | Appel | 401/45 |
| 2,821,330 | 1/1958 | Meylan | 222/214 |
| 2,823,633 | 2/1958 | Meier et al. | 228/35 |
| 3,075,229 | 1/1963 | Rufo | 401/186 |
| 3,231,924 | 2/1966 | Lofgren | 401/198 |
| 3,247,828 | 4/1966 | Basham | 401/266 |
| 3,439,857 | 4/1969 | Bennett | 228/54 |
| 4,149,814 | 4/1979 | Manwaring | 401/162 |
| 4,749,618 | 6/1988 | Kawaguchi et al. | 401/198 |
| 4,932,802 | 6/1990 | Cantone | 401/198 |

FOREIGN PATENT DOCUMENTS 1155390A 5/1985 U.S.S.R. ............................. 228/33

Primary Examiner—Richard K. Seidel
Assistant Examiner—Jeanne M. Elpel
Attorney, Agent, or Firm—Thomas G. Berry; Vincent B. Ingrassia

[57] ABSTRACT

A dispenser (100) for solder flux includes a first solder flux reservoir (110) with a dispensing tip (118) at one end thereof for dispensing solder flux (112) in response to a frictional pressure applied to the tip. A second solder flux reservoir (102) is also included having a dispensing channel (106) for dispensing solder flux (104) responsive to a pressure applied to the flux (104) within the second solder flux reservoir (102).

8 Claims, 2 Drawing Sheets

SOLDER FLUX DISPENSER SUITABLE FOR USE IN AUTOMATED MANUFACTURING

FIELD OF THE INVENTION

This invention relates in general to the field of automated manufacturing (soldering) of printed circuit boards, and more specifically to the automatic dispensing of a solder flux onto printed circuit boards prior to soldering components to the boards.

BACKGROUND OF THE INVENTION

In contemporary manufacturing environments, electronic circuits boards are processed (e.g., soldered) to electrically couple components to the circuit board. Typically, flux is applied to all or some of the area to be soldered so as to facilitate the soldering process. Historically, manufacturers have employed syringes filled with solder flux or brushes dipped in a well of solder flux to apply the solder flux to those areas of a printed circuit board (or the like) to be fluxed. Such practices are generally ineffective in applying a uniform flux film (or layer) in a controlled manner. Additionally, brush dispensing techniques are known to contaminate the solder flux well (i.e., consequently contaminating the printed circuit boards), therefore requiring the well to be continuously cleaned and replenished with fresh solder flux. Accordingly, these prior solder fluxing practices generally result in poor yields, reduced production output, and early product failure.

When a product fails in the field, repair technicians must remove defective components and flux and solder replacement components to effect a proper repair. In the past, repair technicians have used the same fluxing techniques as used in the manufacturing environment, which regrettably have tended to produce the same insufficient results. Accordingly, a need exists in the art for a solder dispenser that can provide a uniform flux layer to an area to be fluxed to avoid the contamination detriments of the past.

SUMMARY OF THE INVENTION

Briefly, according to the invention, there is provided a dispenser for solder flux having a first solder flux reservoir with a dispensing tip at one end thereof for dispensing solder flux in response to a frictional force applied to the tip. A second solder flux reservoir is included having a dispensing channel for dispensing solder flux responsive to a pressure applied to the flux within the second solder flux reservoir.

DESCRIPTION OF A PREFERRED EMBODIMENT

Figure 1:
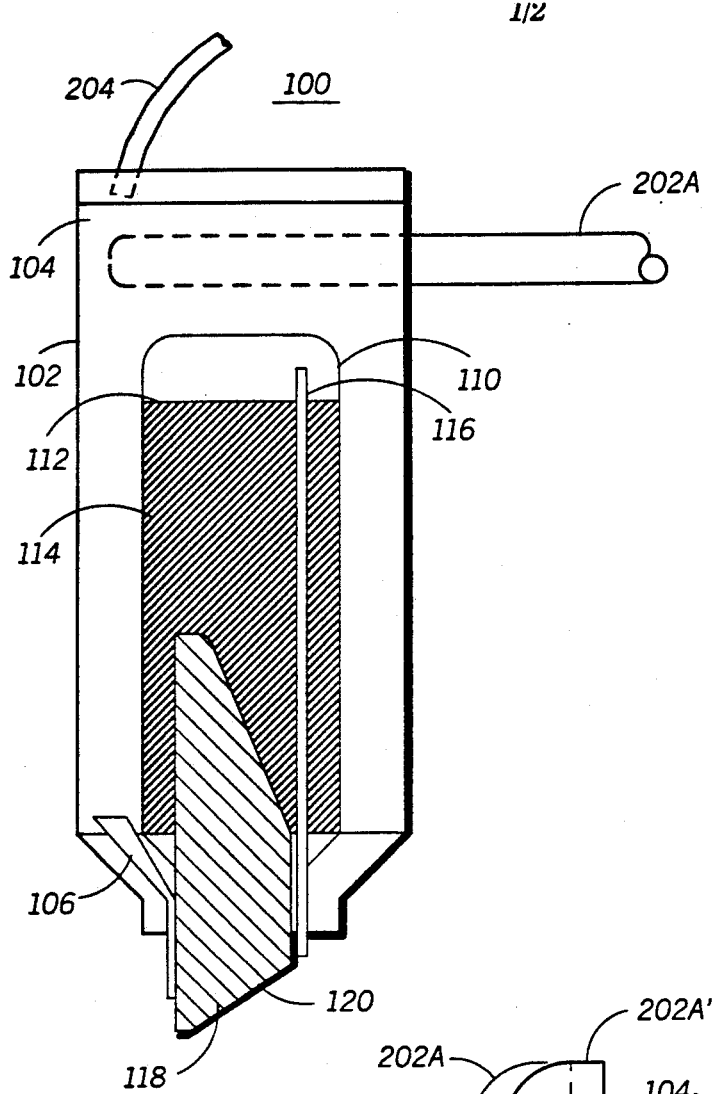
FIG. 1 is a cross sectional side view of a solder flux dispenser in accordance with an embodiment of the present invention.

Referring to FIG. 1, a cross sectional side view of a solder flux dispenser 100 is shown, in accordance with an embodiment of the present invention. The dispenser 100 comprises an outer solder flux reservoir 102 and an inner solder flux reservoir 110. The outer reservoir 102 dispenses solder flux 104 via a dispensing channel 106, and the inner reservoir 110 dispenses solder flux 112 via a felt tip 118 applicator. The two dispensing mechanisms may operate substantially independent of each other, providing advantages that will be more fully discussed below.

The outer reservoir 102 may preferably be constructed from polypropylene material, and arranged such that the volume of solder flux (e.g., preferably a no clean flux or low residue flux such as KESTER 923 or MULTICORE X33) 104 is substantially sealed and contained within. The dispensing channel 106 allows the sealed volume of solder flux 104 to be dispensed in response to additional pressure being applied to the flux 104 within the reservoir 102. The additional pressure that may be required to dispense may preferably be applied via compressive pressure to the outer reservoir 102.

Figure 2:
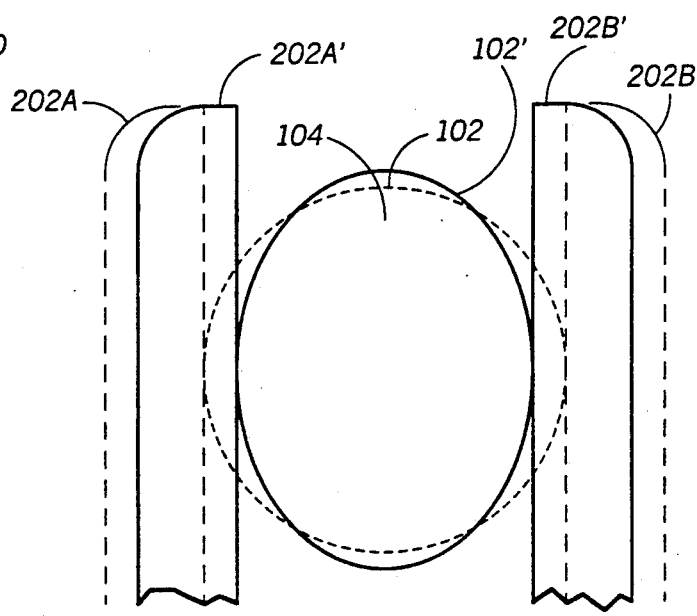
FIG. 2 is a top view of the solder flux dispenser of the present invention utilized in an automated manufacturing environment.

FIG. 2 is a top view of the solder flux dispenser 100 illustrating the outer reservoir 102 under compressive pressure. A robotic effector (e.g., 202A and 202B) may be capable of grasping the outer reservoir 102 and applying a controlled compressive pressure (202A', 202B', and 102') to the reservoir 102 and the flux 104 contained therein. Alternatively, a pneumatic pump (not shown) may provide the controlled additional pressure into the reservoir 102 via an air tube or hose 204 (see FIG. 1). Therefore, the outer reservoir 102 and associated channel 106 are capable of dispensing the required volume of solder flux 104 in response to the additional pressure.

Referring again to FIG. 1, the inner reservoir 110 may preferably be constructed from polypropylene material, and arranged such that the volume of solder flux (i.e., a similar no clean flux or low residue flux, as discussed above) 112 is substantially sealed and contained within. An absorbent member 114 (e.g., a sponge made of polyester fibers) may be saturated with the flux 112 for holding the solder flux 112 within the inner reservoir 110. An air channel 116 may provide a volume of air to facilitate the dispensing of the solder flux 112 from preferably the felt tip applicator 118.

The felt tip 118, in this embodiment of the present invention, may preferably be constructed from acrylic fiber or molded KYMAR material. The tip 118 may be arranged at one end of the inner reservoir 110 such that it couples the solder flux 112 contained therein to an exemplary printed circuit board 300 (see FIGS. 3A and 3B).

Figure 3A:
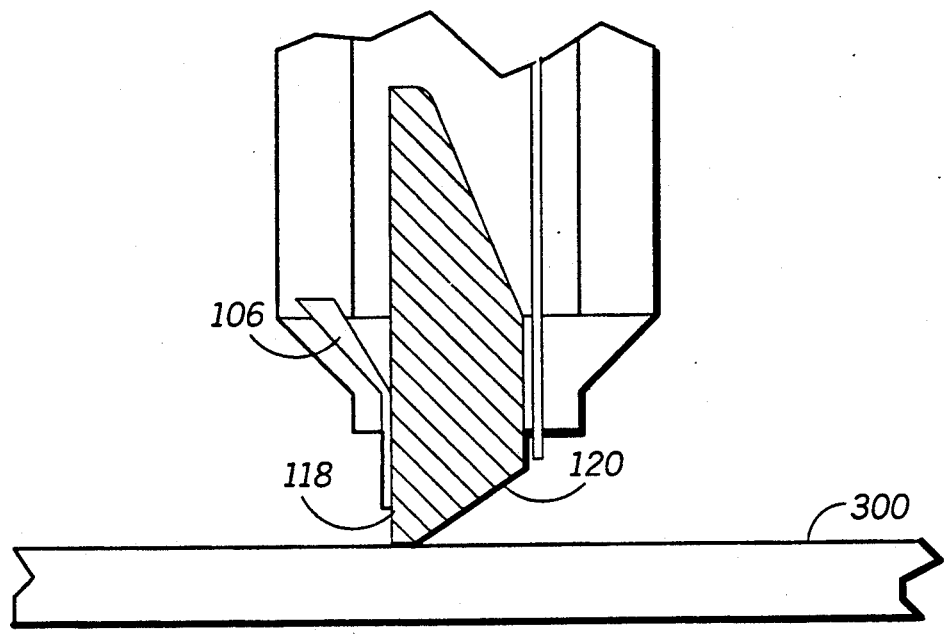
FIGS. 3A and 3B are side views of the solder flux dispenser of the present invention utilized in an automated manufacturing environment.
Figure 3B:
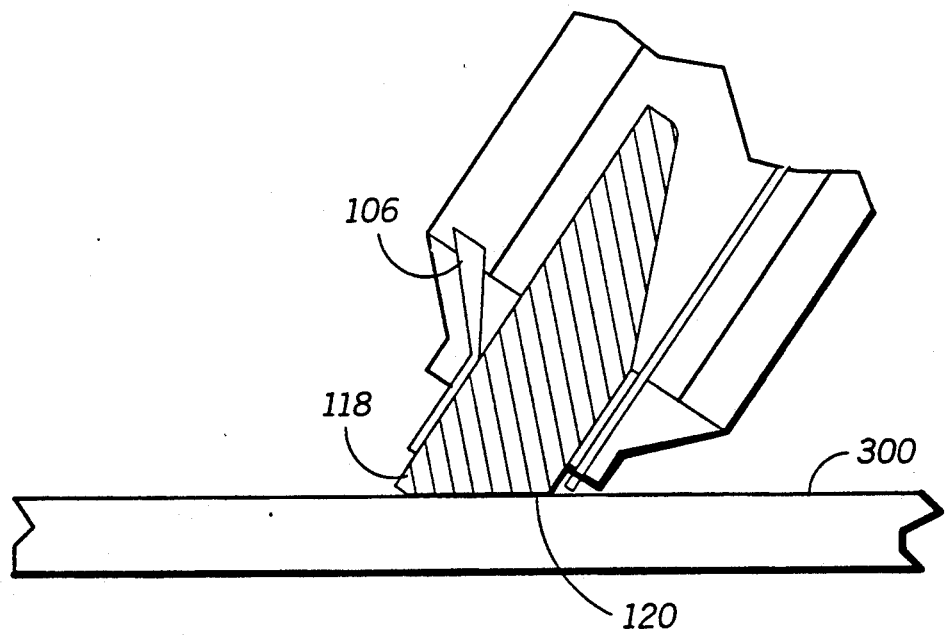

The tip 118 includes an angled end portion 120 that allows uniform dispensing of the solder flux 112 onto the printed circuit board 300, optionally using a substantially fine width application (i.e., as shown in FIG. 3A) or a substantially wide width application (i.e., as shown in FIG. 3B). Therefore, in an automated environment a robotic effector (not shown for FIGS. 3A and 3B) may dispense a controlled uniform application of the solder flux 112 from the inner reservoir by contacting the printed circuit board 300 (i.e., applying a frictional pressure) with the felt tip 118 at the optimal angle. Moreover, the solder flux 112 may be uniformly dispensed onto the printed circuit board 300 with minimal opportunity for contamination.

Additionally, in similar fashion, a repair technician may be capable of repairing components on a failed printed circuit board using the inventive flux dispenser 100 to resolder replacement components onto the printed circuit board 300. Either reservoir (i.e., 102 and 110) may provide the required solder flux (i.e., 104 and 112) for the repair operation. The outer reservoir 102 and associated dispensing channel 106 may provide a larger volume of flux 104, as necessary. The inner reservoir 110 and associated felt tip 118 may provide a uniform thin layer of solder flux 112 onto the printed circuit board 300. Consequently, the required volume of solder flux 112 may be uniformly dispensed onto the printed circuit board 300 with minimal opportunity for contamination.

We claim:

1. A dispenser for solder flux, comprising:
a first solder flux reservoir having a dispensing tip at one end thereof for dispensing solder flux responsive to a frictional pressure applied to the tip; and
a second solder flux reservoir substantially surrounding the first solder flux reservoir and dispensing solder flux separate from the first solder flux reservoir, and having a dispensing channel for dispensing solder flux responsive to pressure applied to the flux within the second solder flux reservoir, the first and second solder flux reservoirs being capable of dispensing the solder flux substantially independent one of the other.

2. The dispenser of claim 1, wherein the first solder flux reservoir includes an air channel for providing a volume of air into the first solder flux reservoir to facilitate the dispensing of the solder flux from the tip.

3. The dispenser of claim 1, wherein the first solder flux reservoir includes an absorbent member for holding the solder flux in the first solder flux reservoir until it is dispensed.

4. The dispenser of claim 1, wherein the tip of the first solder flux reservoir comprises a felt tip having an angled end portion.

5. A dispenser for solder flux, comprising:
an inner solder flux reservoir having a dispensing tip at one end thereof for dispensing solder flux responsive to a frictional pressure applied to the tip; and
an outer solder flux reservoir substantially surrounding the inner solder flux reservoir and having a dispensing channel for dispensing solder flux responsive to pressure applied to the flux within the outer solder flux reservoir.

6. The dispenser of claim 5, wherein the inner solder flux reservoir includes an air channel for providing a volume of air to facilitate the dispensing of the solder flux from the tip.

7. The dispenser of claim 5, wherein the inner solder flux reservoir includes an absorbent member for holding the solder flux in the inner solder flux reservoir until it is dispensed.

8. The dispenser of claim 5, wherein the tip of the inner solder flux reservoir comprises a felt tip having an angled end portion.

* * * * *